Nov. 12, 1963  J. R. DE HAAN  3,110,324
SUPPORT SYSTEM FOR CONDUITS FOR CRYOGENIC LIQUID
Filed March 20, 1961  3 Sheets-Sheet 1
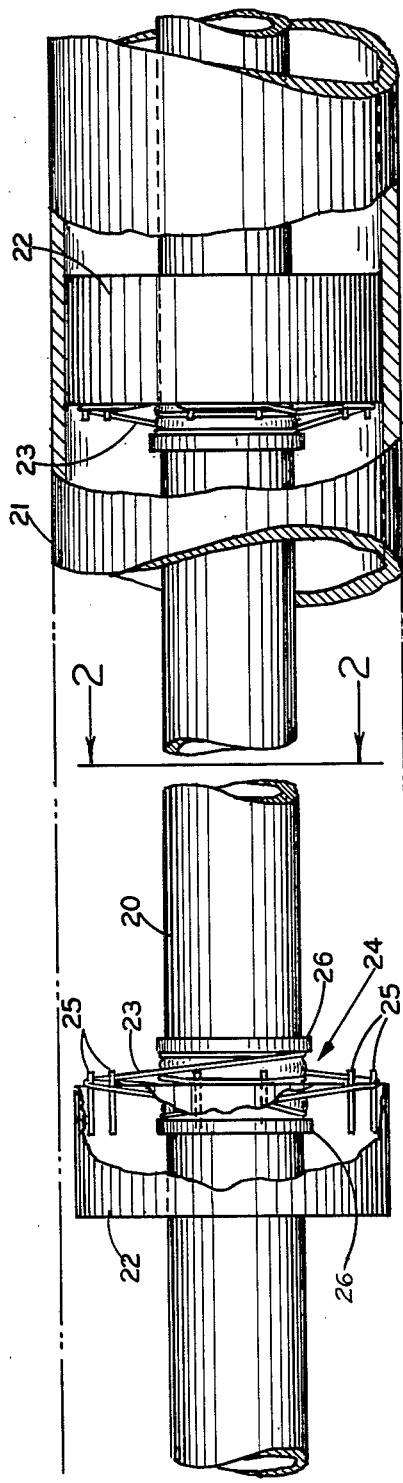
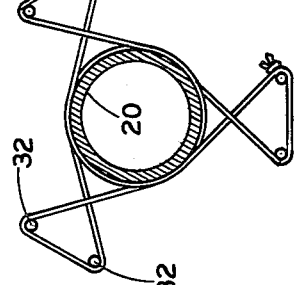
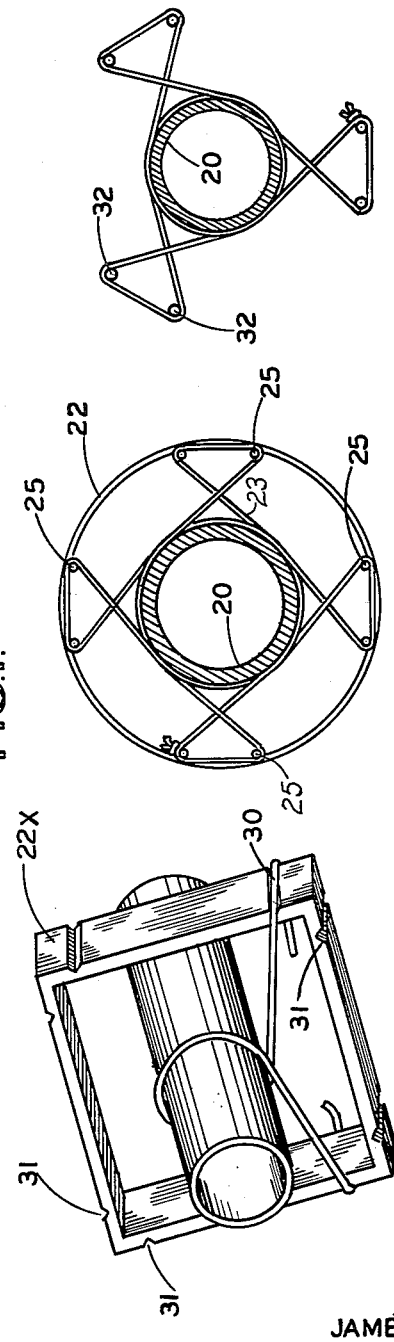
INVENTOR.
JAMES R. DE HAAN
BY
McGrew & Edwards
ATTORNEYS

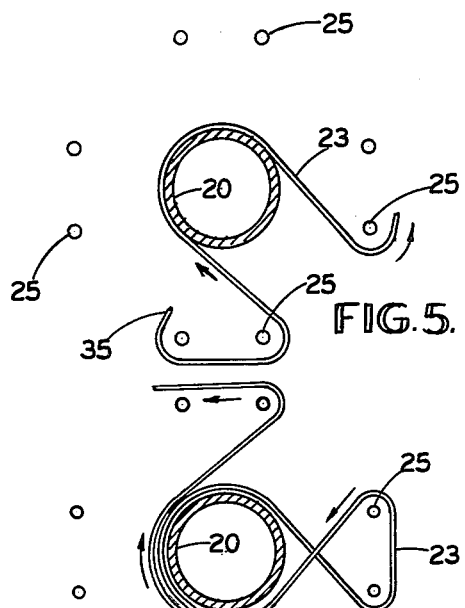
FIG.5.
FIG.6.
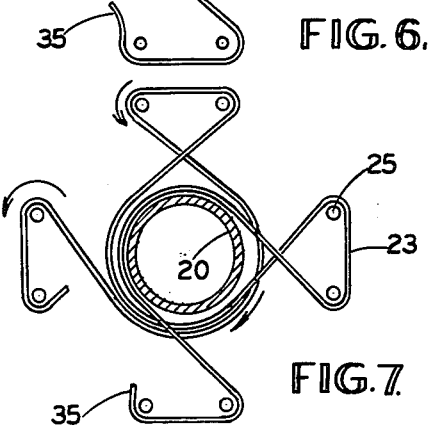
FIG.7.
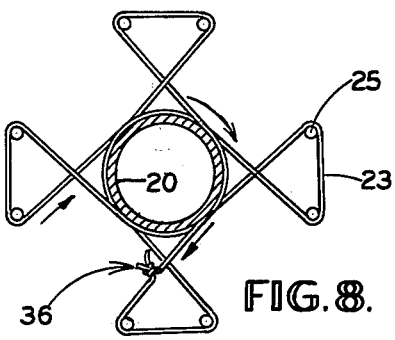
FIG.8.
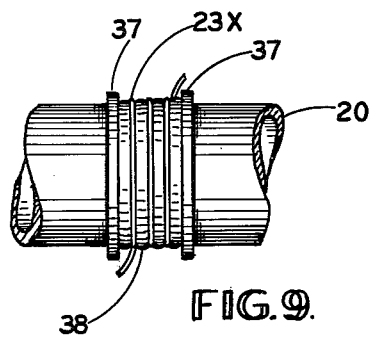
FIG.9.
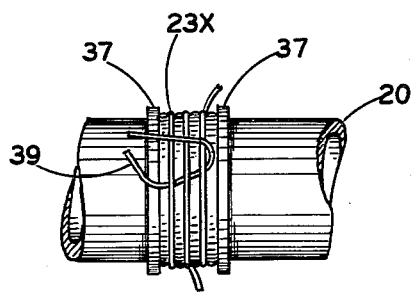
FIG.10.
*INVENTOR.*
JAMES R. DE HAAN
BY
ATTORNEYS United States Patent Office 3,110,324
Patented Nov. 12, 1963

3,110,324
SUPPORT SYSTEM FOR CONDUITS FOR CRYOGENIC LIQUID
James R. De Haan, Boulder, Colo., assignor to Cryogenic Engineering Company, Denver, Colo., a corporation of Colorado
Filed Mar. 20, 1961, Ser. No. 97,046
14 Claims. (Cl. 138—148)

This invention relates to transfer lines for cryogenic liquids, and more particularly relates to suspension assemblies and devices for mounting an inner tubular member in spaced relation to an outer tubular casing or housing.

Transfer lines for cryogenic liquids usually consist of two concentric tubes with the annular space evacuated. The inner line is isolated from the outer tube by means of spacers having a low thermal conductivity but some heat reaches the inner line through the spacers now in general use.

It is an object of my invention to provide a simple, durable and efficient spacer or suspension device for the inner line of a transfer line assembly for cryogenic liquids which will have an exceptionally low heat transfer rate.

Another object of my invention is to provide a suspension system for transfer line conduits which is easily adjustable for positioning requirements and substantially eliminates heat transfer between such line and its enclosure.

A further object of this invention is to provide a simple, durable and efficient spacing support for transfer line conduits which is easily assembled or disassembled and which has exceptional load-carrying properties.

Other objects reside in novel details of construction and novel combinations and arrangements of parts, all of which will be explained in the course of the following description.

The present invention represents a departure from prior practices in substantially reducing contact areas between an outer tubular housing and an inner transfer line through the supporting structure for such line. It also provides a suspension mounting of the inner transfer line in material of low thermal conductivity which has a minimum of contact area for heat transfer and more than adequate load-carrying properties. The invention comprehends a variety of embodiments and structural forms suited to the requirements of special uses and permits selection of a variety of materials according to the user's preference for a given installation.

The practice of the invention will be more readily understood by reference to the accompanying drawings in the several views of which corresponding parts bear similar reference numerals.

In the drawings:

FIG. 1 is a side view, in partial section and partially broken away, of a heat insulated conduit assembly for low temperature fluids embodying my inventive concepts;

FIG. 2 is a sectional view along the line 2—2 of the assembly of FIG. 1;

FIG. 3 is a perspective view of an alternative filament-retaining structure and arrangement usable in an assembly such as shown in FIG. 1;

FIG. 4 is an end view, in partial section, of an alternative filament threading arrangement and retaining structure usable in an assembly such as shown in FIG. 1;

FIGS. 5 through 8 are illustrative of sequential stages or steps in threading the support filament for suspending the heat insulated conduit in the assembly of FIG. 1;

FIG. 9 is a detailed, fragmentary, side elevation of an arrangement for maintaining loops of filament in place on the heat insulated conduit of an assembly of the type shown in FIG. 1;

FIG. 10 is a detailed, fragmentary, side elevation of another filament holding arrangement;

Figure 11:
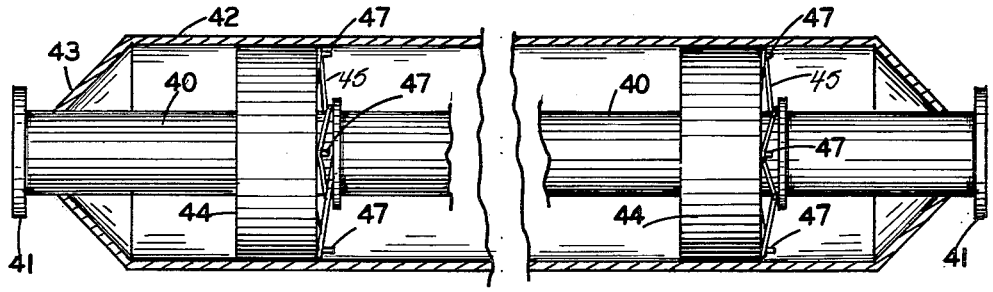
FIG. 11 is a fragmentary side elevation, in partial section and on a reduced scale, of a modified form of heat insulated conduit assembly.

Before describing the drawings in detail, I wish it understood that they are but exemplary of arrangements according to my concepts and that the spirit and scope of the invention are to be as defined in the hereafter appended claims.

A heat insulated conduit assembly according to my preferred practice is comprised of the following components, shown in FIG. 1: an inner low temperature fluid conduit 20, an outer conduit housing or closure member 21, annular or hollow filament retaining means 22, stretches of filaments 23, and an arrangement, generally indicated at 24, for the purpose of maintaining filament loops in place about conduit 20 in the desired spacing and arrangement.

The fluid conduit or inner tubular member 20 is an elongated, substantially rigid, tubular structure of metal having properties of relatively high coefficients of heat transfer and thermal conductivity. The conduit housing or outer tubular member 21 is elongated and may be composed of any suitable material, usually metal, and preferably is closed at its ends, allowing terminal portions of the conduit to extend therebeyond (as shown, for example, in FIG. 11 and described later). The space between the fluid conduit 20 and the closure member 21 preferably is substantially evacuated in any well known manner to remove substantially all contained gas and thereby take benefit of the limited capacity for heat transfer through a vacuum.

As a further preventative against heat transfer, the filaments or cords 23, which are the means of suspending the conduit 20 within the housing 21 intermediate its ends, are composed of a flexible, substantially non-elastic material of low thermal conductivity. Preferably, I use filaments formed from synthetic polyester fibers which are found to possess the desired properties. "Dacron," the Du Pont Company's synthetic polyester fiber made from methyl terephthalate and ethylene glycol, is a preferred material.

The hollow filament-retaining means 22 are arranged for slidable friction fit within the interior of the conduit housing 21 and are located at spaced intervals intermediate the ends thereof. Each carries a series of projections or lugs 25 preferably arranged in pairs, with the pairs uniformly spaced circumferentially of the assembly for securing and supporting the outer ends of the stretches of the filament 23. A pair of spaced bands 26 is mounted on the exterior surface of the conduit 20 in register with each retaining means 22 and hold the inner stretches or wraps of the filament 23 against lengthwise movement on the said outer surface of the conduit 20.

Referring to the arrangement shown in FIG. 2, the stretches of filament 23 between the respective pairs of lugs 25 and the conduit 20 are threaded from a single continuous filament, drawn into a taut condition wherein they are of substantially equal length, thereby maintaining the inner conduit in a substantially immovable concentric relationship with the housing 21 about a common lengthwise central axis. Because of the flexible and yet substantially non-elastic physical characteristics of the filament and the suspension arrangement by which the conduit is held in a suitable vacuum out of contact with substantial heat exchange surfaces, there is negligible heat transfer between the atmosphere outside of housing 21 and the contents of conduit 20. Also, sudden jars, drops, etc., which may impart impact energy through the assembly will be substantially absorbed by the flexible webbing of the stretches of filament 23, thereby overcoming the tendency to snap or break the respective components from which the assembly is fabricated.

FIG. 3 is illustrative of a modified filament suspension device 22x which may be used to retain the outer loops 30 of the filament by means of laterally extending pairs of parallel grooves 31 acting as seats therefor. The device 22x is of suitable dimension for sliding on the inner surfaces of a housing such as 21 and to be frictionally held at its corners when it comes to rest. This arrangement also provides uniform length to the stretches of filament extending from the device to conduit 20.

FIG. 4 is illustrative of another alternative filament retaining and lacing arrangement wherein the retaining means such as 22 of FIG. 1 will have spaced apart pairs of lugs 32 spaced circumferentially at approximately 120°. As illustrated, a single length of filament is used but a plurality of shorter lengths may be used when desired.

FIGS. 5 through 8 are indicative of sequential steps or stages of the operation by which a continuous length of filament 23 is laced to suspend the conduit 20 substantially concentrically in the outer housing 21. A terminal end portion 35 of the filament is held in a substantially fixed position and looped around one of the pairs of lugs 25, which the other end of the filament is laced around the outer surface of the conduit 20 and returned outwardly to pass across the next pair of lugs 25, in the sequence indicated by the arrows in FIG. 5. The lacing is repeated in counterclockwise progression as indicated by the arrows in FIG. 6. The same progression is continued as shown in FIG. 7, and the free end of filament finally is led back around the conduit 20 and knotted in engagement with the terminal portion 35, as generally indicated at 36 in FIG. 8. The configuration thus established comprises four figure eights having smaller supporting loops about each pair of lugs 25 and a larger loop formed about the conduit 20 in each wind or wrap.

It has been found desirable to arrange the inner loops of the filament 23 contacting the conduit 20 in uniform spacing and to hold them against creeping movement thereon. To this end an arrangement such as shown in FIG. 9 is utilized wherein a pair of spaced apart bands 37 of substantial thickness are fixedly secured to the outer peripheral surface of the conduit 20, thereby defining a surface area therebetween in which the inner loops 23x of the filament are laced in spaced relation. Also, an adhesive material, generally indicated at 38, may be applied between the respective loops 23x and the bands 37 to hold the loops or wraps in a substantially fixed relation.

FIG. 10 is an alternative arrangement wherein the loops or wraps 23x are maintained between the spaced apart bands 37, or may be held substantially immovable relative to each other solely by filament tie 39 which is knotted to draw the loops or wraps 23x into a taut, substantially fixed group.

The crux of the invention as described above is the use of a flexible, substantially non-elastic filament threaded in taut suspending relation between an inner fluid conduit and an outer housing 21, with the space therebetween substantially evacuated and providing only a minimum of contact surface between said inner and outer members.

FIGS. 11 through 16 are alternative arrangements of the essential components above mentioned, and a modified assembly of those components is shown in FIG. 11. An elongated, tubular, inner conduit 40 having flanged ends 41 for suitable attachment to auxiliary equipment is housed within an elongated tubular closure member or housing 42 having sloping or conical ends 43 in gas-sealing engagement with terminal portions of the conduit 40 internally of the flanges 41. One or a plurality of filament retaining means or sleeves 44 are slidably positioned in frictional engagement with the interior surfaces of the housing intermediate its ends. Single lugs 47 are spaced circumferentially at 90° intervals on sleeve 44 and the filament 45 is laced over such lugs and around conduit 40 in a progression similar to the one shown in FIG. 8. The ends are brought together and secured as shown at 50 in FIG. 12.

Figure 12:
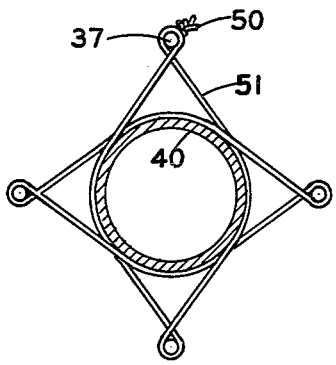
FIG. 12 is an end view, in partial section, of a filament threading arrangement for the assembly of FIGS. 1 and 11.
Figure 13:
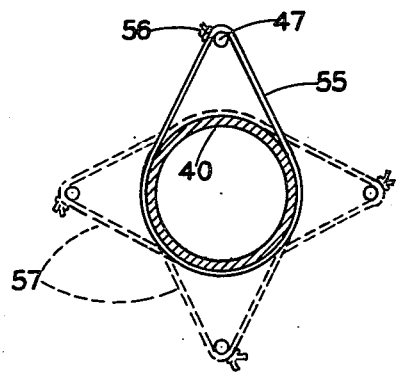
FIG. 13 is an end view, in partial section, illustrating the first step in an alternative filament threading arrangement and indicating successive steps by dash line representations.

The arrangements of FIGS. 12 and 13 are suitable lacing arrangements when such retaining sleeves are used. In FIG. 12 a single filament 51 is used whereas in FIG. 13 a series of short lengths 55 are provided with a tie 56 at each post 47. The lacing sequence is essentially the same as in FIG. 12, but this arrangement simplifies the balancing of the tautness in the series of stretches and avoids undue stretching during operation. In FIG. 13 a first of the four filaments 55 is shown looped about a lug 47 and the exterior surface of the conduit 40. The dotted line representations indicated by reference numeral 57 are indicative of the similar placement of the other three lengths of filament to obtain four-point suspending support for a conduit 40.

Figure 14:
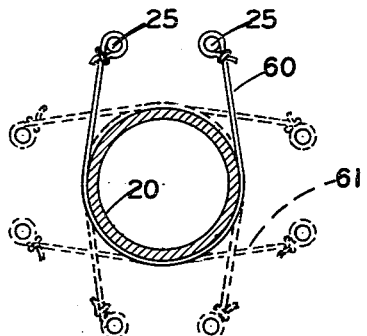
FIG. 14 is an end view, in partial section, of the first step in another alternative filament threading arrangement.
Figure 15:
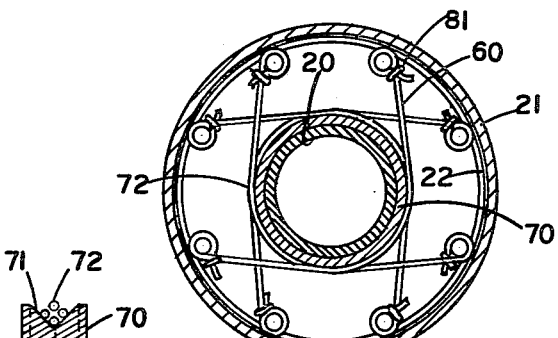
FIG. 15 is an end view, in partial section, of a heat insulated conduit assembly according to my concept, showing the filament arrangement of FIG. 14 in a completed configuration.

Still another arrangement utilizing four separate lengths of filament 60 is shown in FIGS. 14 and 15, utilizing a series of four pairs of lugs 25 of the type used with the assembly of FIGS. 1 and 2. With such an arrangement, terminal ends of each of the stretches or lengths of filaments 60 are knotted on adjoining members of each pair of lugs, while the intermediate portion is laced about the exterior surface of conduit 20 in a 180° supporting relation therewith. The dotted line representations 61 (FIG. 14) are indicative of the placement of the other three lengths of filament.

Figure 16:
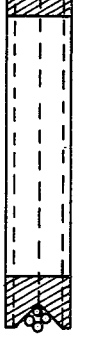
FIG. 16 is a sectional side elevation illustrating another arrangement for maintaining filament loops in position about the heat insulated conduit of an assembly embodying my invention.

Another mounting arrangement is shown in FIGS. 15 and 16 which provides a simplified assembly procedure and is effective in preventing deleterious heat transfer. In this embodiment a sleeve or annulus 70 is mounted on the inner conduit member 20 in frictional gripping relation thereto and is located in register with each of the retaining members such as the members 22. The peripheral surface of annulus 70 is grooved as shown at 71 in FIG. 16 and the loops or wraps 72 of the filament are held in the groove and drawn taut by tying the knots 81 shown in FIG. 15.

In all of the assemblies and mounting arrangements described, the outer tubular member is substantially spaced from the inner conduit throughout most or all of the intermediate portion of the enclosure. The suspension of the inner conduit by material having low coefficients of heat transfer and thermal conductivity and the evacuation of gas from the enclosed space permit flow of low temperature fluids through the conduit without significant heat input. The filaments are capable of operation over long periods without failure or fatigue and each suspension unit will have a load-carrying capacity much in excess of the maximum load it is required to support and yet have only a minimum contact surface area for heat transfer.

Where it is necessary to have the inner tubular member in concentric relation to the outer tubular member, the various lacing arrangements provide a simple assembly for exact placement. Usually, a substantially concentric relation is all that is required, but in any event the stretches of the filament should be drawn taut to prevent any appreciable stretching during operation.

While the present invention has its greatest utility when used in transfer lines for cryogenic liquids, it has another industrial application where it affords a considerable degree of utility, i.e., as a suspension means or system for an inner line or conduit so as to establish electrical insulation between said line and an outer tubular line in which it is encased in underground installations. A variety of filament materials are available which are poor electrical conductors and provide the required load-carrying capacity. The "Dacron" filament previously described is well suited for such installations.

In the preceding description, I have described certain materials as filaments which are well suited to the purposes of my invention. However, any suitable material may be employed as the filament so long as it provides a minimum of contact surface, flexibility and low thermal or non-electric conductivity. The various mounting arrangements illustrated in the drawings are intended to be interchangeable and structural features illustrated in one assembly are usable in all the assemblies shown. Changes and modifications may be availed of within the spirit and scope of the invention as defined in the hereunto appended claims.

I claim:

1. A suspension structure for heat-insulated support of conduits for fluids, comprising a hollow member adapted to be held in supported engagement with internal surfaces of a conduit housing, filament securing means at a plurality of circumferentially spaced points on said hollow member, and a narrow filament of low heat conductivity extending from said filament securing means and adapted to be laced around a conduit for fluids within the housing as the sole supporting suspending interconnection between the conduit and the housing, whereby said conduit is maintained in heat-insulated and spaced relation to the internal surfaces of said housing.

2. A suspension structure for heat-insulated support of conduits for fluids, comprising a hollow member adapted to be held in supported engagement with internal surfaces of a conduit housing, filament securing means at a plurality of circumferentially spaced points on the hollow member, and a "Dacron" filament extending from said filament securing means and adapted to be laced around a conduit for fluids within said housing as the sole supporting interconnection between the conduit and the housing whereby said conduit is maintained in heat-insulated and spaced relation to the internal surfaces of said housing.

3. The combination with an outer conduit housing of heat-conductive material and an inner transfer line for fluids formed of heat-conductive material, of means supporting said inner line in spaced and heat-insulated relation to said outer housing at at least one point intermediate its ends, said means including a hollow member engaging inner surfaces of said housing and supported thereby at a plurality of circumferentially spaced points, and a filament of low thermal conductivity encompassing said inner line and secured on said hollow member at a plurality of circumferentially-spaced points as the sole supporting interconnection between the transfer line and the hollow member, whereby heat transfer between the line and the housing is essentially eliminated.

4. The combination with an outer conduit housing of heat-conductive material and an inner transfer line for fluids formed of heat-conductive material, of means supporting said inner line in spaced and heat-insulated relation to said outer housing at at least one point intermediate its ends, said means including a hollow member engaging inner surfaces of said housing and supported thereby at a plurality of circumferentially spaced points, and a tautened filament of low thermal conductivity encompassing said inner line and secured on said hollow member at a plurality of circumferentially-spaced points as the sole supporting interconnection between the transfer line and the hollow member, whereby heat transfer between the line and the housing is essentially eliminated.

5. The combination with an outer conduit housing of heat-conductive material and an inner transfer line for fluids formed of heat-conductive material, of means supporting said inner line in spaced and heat-insulated relation to said outer housing at at least one point intermediate its ends, said means including a hollow member engaging inner surfaces of said housing and supported thereby at a plurality of circumferentially spaced points, a filament-securing member on an external surface of the line, and an endless filament of low thermal conductivity encompassing said filament-securing member and secured on said hollow member at a plurality of circumferentially-spaced points as the sole supporting interconnection between the transfer line and the hollow member, whereby heat transfer between the line and the housing is essentially eliminated.

6. The combination with an outer conduit housing of heat-conductive material and an inner transfer line for fluids formed of heat-conductive material, of means supporting said inner line in spaced and heat-insulated relation to said outer housing at at least one point intermediate its ends, said means including a hollow member engaging inner surfaces of said housing and supported thereby at a plurality of circumferentially spaced points, and an endless filament of low thermal conductivity encompassing said inner line and having tautened stretches of uniform length secured on said hollow member at a plurality of circumferentially-spaced points for maintaining the transfer line in concentric relation with the outer conduit and providing the sole supporting interconnection between the transfer line and the hollow member, whereby heat transfer between the line and the housing is essentially eliminated.

7. The combination with an outer conduit housing of heat-conductive material and an inner transfer line for fluids formed of heat-conductive material, of means supporting said inner line in spaced and heat-insulated relation to said outer housing at at least one point intermediate its ends, said means including a hollow member engaging inner surfaces of said housing and supported thereby at a plurality of circumferentially-spaced points, and an endless filament of non-elastic low thermal conductivity encompassing said inner line and having tautened stretches of uniform length secured on said hollow member at a plurality of circumferentially spaced points for maintaining the transfer line in concentric relation with the outer conduit and providing the sole supporting interconnection between the transfer line and the hollow member, whereby heat transfer between the line and the housing is essentially eliminated.

8. A heat insulated conduit for low temperature fluids comprising an outer tubular enclosure, an inner fluid conduit having its exterior surfaces substantially spaced from interior surfaces of said enclosure, and means for suspending the conduit within the enclosure at at least one position intermediate its ends, inclusive of filaments of flexible, substantially non-elastic material of low thermal conductivity, terminal portions of which are held on the enclosure and at the conduit, respectively, and collectively providing the sole support for said conduit intermediate its ends, and the space between said enclosure and said conduit being under at least a partial vacuum.

9. A heat insulated conduit for low temperature fluids comprising an outer tubular enclosure, an inner fluid conduit having its exterior surfaces substantially spaced from interior surfaces of said enclosure, and means for suspending the conduit within the enclosure at at least one position intermediate its ends, inclusive of a filament of flexible, substantially non-elastic material of low thermal conductivity held at at least three spaced points on the enclosure and alternately looped around the conduit, and collectively providing the sole support for said conduit intermediate its ends, means for maintaining the looped portion of the filament in substantially immovable relation to the conduit, the space between said enclosure and said conduit being under at least a partial vacuum.

10. In a heat insulated conduit assembly for low temperature fluids having an inner conduit member for fluids extending through a tubular enclosure member with the exterior surfaces of the conduit member in substantially spaced relation to internal surfaces of enclosure intermediate the ends thereof, the improvement which comprises at least one suspending support for the conduit along the length thereof intermediate its ends, said support comprising an annular member in peripheral contact with and supported by internal surfaces of said enclosure, and a plurality of loops of low thermal conductivity material extending in suspending support of said conduit member from circumferentially spaced points of connection on the annular member, and the space between said enclosure and the conduit member being substantially evacuated so as to maintain the inner member out of heat-transfer relation with the enclosure member.

11. A heat-insulated transfer line assembly for cryogenic liquids comprising an imperforate, elongated, tubular housing member terminating at its ends in narrow bearing surfaces for an elongated transfer line for cryogenic liquids extending from one end of the housing to the other and held in gas-sealing contact with said bearing surfaces, at least one line supporting member intermediate the ends of said housing comprising a hollow member engaging inner surfaces of said housing and supported thereby at a plurality of circumferentially-spaced points, and a filament of low thermal conductivity encompassing the line and secured on said hollow member at a plurality of circumferentially-spaced points as the sole interconnection between the line and the hollow member, and the space between the line and the housing being essentially gas evacuated, whereby heat transfer between the line and the housing is essentially eliminated.

12. A heat-insulated transfer line assembly for cryogenic liquids comprising an imperforate, elongated, tubular housing member terminating at its ends in narrow bearing surfaces for an elongated transfer line for cryogenic liquids extending from one end of the housing to the other and held in gas-sealing contact with said bearing surfaces, at least one line supporting member intermediate the ends of said housing comprising a hollow member engaging inner surfaces of said housing and supported thereby at a plurality of circumferentially-spaced points, a filament of low thermal conductivity encompassing the line and supported from said hollow member at a plurality of circumferentially spaced points, and means securing the filament to the hollow member at said spaced points, said filament and said means comprising the sole interconnection between the line and the hollow member, and the space between the line and the housing being essentially gas evacuated, whereby heat transfer between the line and the housing is essentially eliminated.

13. The combination with an outer conduit housing of heat-conductive material and an inner transfer line for fluids formed of heat-conductive material, of means supporting said inner line in spaced and heat insulated relation to said outer housing at at least one point intermediate its ends, said means including a hollow member engaging inner surfaces of said housing and supported thereby at a plurality of circumferentially-spaced points, and a filament of low thermal conductivity and of small cross section encompassing said inner line and secured on said hollow member at a plurality of points out of contact with said housing as the sole supporting interconnection between the transfer line and the hollow member, and the interconnection assembly having narrow contact surfaces on the hollow member and the line, whereby heat transfer between the line and the housing is essentially eliminated.

14. The combination as defined in claim 13 in which the filament is a synthetic polyester fiber made from terephthalate and ethylene glycol.

References Cited in the file of this patent

UNITED STATES PATENTS

| 2,759,491 | Everhart | Aug. 21, 1956 |
| 2,978,840 | Tatsch | Apr. 11, 1961 |

FOREIGN PATENTS

| 639,038 | Great Britain | June 21, 1950 |